(12) United States Patent
Inam et al.

(10) Patent No.: US 10,938,314 B2
(45) Date of Patent: Mar. 2, 2021

(54) EARLY DETECTION OF FAULTS IN POWER TRANSMISSION LINES

(71) Applicant: Smart Wires Inc., Union City, CA (US)

(72) Inventors: Haroon Inam, San Jose, CA (US); Hamed Khalilinia, Hayward, CA (US)

(73) Assignee: Smart Wires Inc., Union City, CA (US)

( * ) Notice: Subject to any disclaimer, the term of this patent is extended or adjusted under 35 U.S.C. 154(b) by 386 days.

(21) Appl. No.: 16/118,219

(22) Filed: Aug. 30, 2018

(65) Prior Publication Data

US 2020/0028442 A1    Jan. 23, 2020

Related U.S. Application Data

(60) Provisional application No. 62/702,223, filed on Jul. 23, 2018.

(51) Int. Cl.
*H02M 5/458* (2006.01)
*H02M 7/49* (2007.01)
*H02J 3/18* (2006.01)

(52) U.S. Cl.
CPC ........... *H02M 5/458* (2013.01); *H02J 3/1814* (2013.01); *H02J 3/1857* (2013.01); *H02M 7/49* (2013.01)

(58) Field of Classification Search
CPC ........ H02M 5/458; H02M 7/49; H02J 3/1814; H02J 3/1857; H02J 3/1807; H02H 3/44; H02H 1/0092; H02H 1/0007; H02H 7/16; H02H 9/02; H02H 7/28; G01R 31/085; G01R 31/3275; G01R 31/088
See application file for complete search history.

(56) References Cited

U.S. PATENT DOCUMENTS

| | | | |
|---|---|---|---|
| 4,020,396 A | 4/1977 | Gambale et al. | |
| 4,077,004 A | 2/1978 | Higo | |
| 4,130,851 A | 12/1978 | Perez-Cavero | |
| 4,141,006 A | 2/1979 | Braxton | |
| 4,161,027 A | 7/1979 | Russell | |
| 4,177,507 A | 12/1979 | Leete | |

(Continued)

FOREIGN PATENT DOCUMENTS

| | | |
|---|---|---|
| CN | 105098726 | 11/2015 |
| EP | 2383581 | 11/2011 |

(Continued)

OTHER PUBLICATIONS

"Extended European Search Report dated Nov. 18, 2019; European Patent Application No. 19187824.8", Nov. 18, 2019.

*Primary Examiner* — Mohamed Charioui
(74) *Attorney, Agent, or Firm* — Womble Bond Dickinson (US) LLP

(57) ABSTRACT

A modular power flow control system having early detection and reporting of transmission line faults is described. The response time for closing a bypass switch and reporting the fault is less than 200 microseconds for hard faults, longer for soft faults. Reprogramming of distance relays is not required. Transmission line faults are characterized using a fault detection sensor suite, normally including at least a current sensor such as a current transformer and a rate of current change sensor such as a Rogowski coil, and in some embodiments, a temperature sensor. Other embodiments are disclosed.

21 Claims, 5 Drawing Sheets

(56) References Cited

U.S. PATENT DOCUMENTS

| | | |
|---|---|---|
| 4,296,450 A | 10/1981 | Paice et al. |
| 4,344,143 A | 8/1982 | Kurosawa et al. |
| 4,455,589 A | 6/1984 | Riordan et al. |
| 4,468,665 A | 8/1984 | Thawley et al. |
| 4,523,281 A | 6/1985 | Noda et al. |
| 4,698,721 A | 10/1987 | Warren |
| 4,825,327 A | 4/1989 | Alexander et al. |
| 5,202,812 A | 4/1993 | Shinoda et al. |
| 5,228,778 A | 7/1993 | Nakatani |
| 5,369,584 A | 11/1994 | Kajiwara |
| 5,422,808 A | 6/1995 | Catanese, Jr. et al. |
| 5,434,509 A * | 7/1995 | Blades ................ H02H 1/0015 324/536 |
| 5,745,322 A * | 4/1998 | Duffy .................... H02H 3/334 361/45 |
| 5,946,172 A | 8/1999 | Hansson et al. |
| 6,259,372 B1 | 7/2001 | Taranowski et al. |
| 6,292,340 B1 | 9/2001 | O'Regan et al. |
| 6,374,913 B1 | 4/2002 | Robbins et al. |
| 6,379,279 B1 | 4/2002 | Miyamoto |
| 6,397,156 B1 | 5/2002 | Bachmann et al. |
| 6,518,767 B1 | 2/2003 | Roberts et al. |
| 6,584,417 B1 | 6/2003 | Hu et al. |
| 6,625,553 B1 | 9/2003 | Modgil |
| 6,629,050 B2 | 9/2003 | Modgil |
| 6,771,079 B2 | 8/2004 | Lin |
| 6,858,953 B2 | 2/2005 | Stahlkopf |
| 6,957,047 B1 | 10/2005 | Young et al. |
| 7,002,260 B2 | 2/2006 | Stahlkopf |
| 7,042,731 B2 | 5/2006 | Schneeberger |
| 7,061,251 B2 | 6/2006 | Taylor et al. |
| 7,269,940 B2 | 9/2007 | Wiseman |
| 7,274,974 B2 | 9/2007 | Brown et al. |
| 7,324,361 B2 | 1/2008 | Siri |
| 7,432,611 B2 | 10/2008 | Stahlkopf |
| 7,496,459 B2 | 2/2009 | McAllister et al. |
| 7,568,402 B2 | 8/2009 | Robinette et al. |
| 7,622,816 B2 | 11/2009 | Stahlkopf |
| 7,660,088 B2 | 2/2010 | Mooney et al. |
| 8,022,708 B2 | 9/2011 | Xie et al. |
| 8,271,214 B2 | 9/2012 | Sezi |
| 8,700,109 B2 | 4/2014 | Amato et al. |
| 8,810,072 B2 | 8/2014 | Tsai et al. |
| 9,046,059 B2 | 6/2015 | Furuta et al. |
| 9,362,736 B2 | 6/2016 | Krenz et al. |
| 9,404,957 B2 | 8/2016 | Chen et al. |
| 9,577,421 B2 | 2/2017 | Barker et al. |
| 9,581,624 B2 | 2/2017 | Rostron et al. |
| 9,866,012 B2 | 1/2018 | Hosny et al. |
| 2008/0249723 A1 | 10/2008 | McAllister et al. |
| 2013/0092208 A1* | 4/2013 | Robbins ............ H01L 31/02021 136/244 |
| 2014/0139956 A1* | 5/2014 | Ward .................... H02H 3/335 361/45 |
| 2017/0110873 A1* | 4/2017 | Glovinski ................ H02H 3/33 |
| 2018/0166874 A1* | 6/2018 | Beierschmitt ........ H02H 1/0015 |

FOREIGN PATENT DOCUMENTS

| | | |
|---|---|---|
| EP | 2549611 | 1/2013 |
| WO | WO-2014/035881 | 3/2014 |

* cited by examiner

Current Transformer

Rogowski coil

EARLY DETECTION OF FAULTS IN POWER TRANSMISSION LINES

CROSS-REFERENCE TO RELATED APPLICATIONS

This application claims the benefit of U.S. Provisional Patent Application No. 62/702,223 filed Jul. 23, 2018, the entirety of which is incorporated herein by reference.

BACKGROUND OF THE INVENTION

1. Field of the Invention

This disclosure relates to fast detection and reporting of faults in power transmission lines. This creates the potential for improved safety to personnel and the possibility of limiting damage in a power distribution system.

2. Prior Art

Transformerless power flow control systems have been developed, having reduced size and weight compared with systems containing isolation transformers.

Existing fault detection systems have comprised distance relays. In a distributed power line mesh, with distance relays at each end of each branch of the mesh, the location of a fault can be estimated, so that the fault may be promptly attended to and the safety of persons be protected. The fault may be from line to ground or from line to line (phase to phase) for example, with multiple combinations of possible faults.

When installing a power flow control system, consisting of transformerless static synchronous series converters (TL-SSSCs) for example, it is important that the installation does not interfere with the operation of existing distance relays, and furthermore, does not require any re-programming of these relays.

Accordingly, there is a need in the art for fault detection systems that do not interfere with or require re-programming of existing distance relays and provide a quicker response to a fault than is available with pre-existing protection systems, so that the power distribution system can take prompt corrective action, to limit damage and safeguard personnel.

DETAILED DESCRIPTION OF THE PREFERRED EMBODIMENTS

Figure 1:
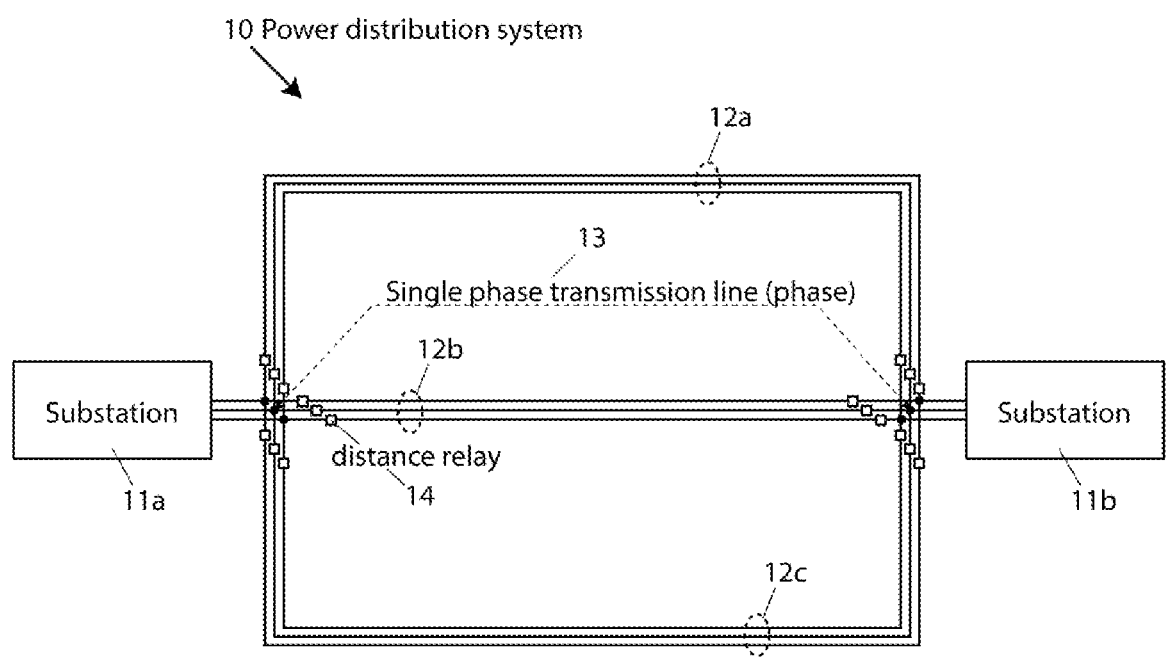
FIG. 1 is a schematic view of a power distribution system comprising a transmission line mesh, with each branch of the mesh comprising three phases, and each phase having a distance relay provided at each end of each branch.

FIG. 1 shows a power distribution system 10 spanning between a pair of substations 11a and 11b. System 10 comprises a mesh network of transmission lines having three phases per branch, 12a, 12b, 12c. Each single phase 13 has a distance relay 14 at each end. The distance relays represent the primary protection system in many power distribution systems. They measure impedance. When a fault occurs, the change in measured impedance is used to approximately predict the location of the fault, so the fault can be serviced by support staff. For the safety of humans that may be in the vicinity of a fault, and to limit damage to transmission lines and associated equipment to the degree possible, it is important to identify and characterize a fault as quickly as possible, including reporting of the fault to one or more support systems if appropriate.

Figure 2:
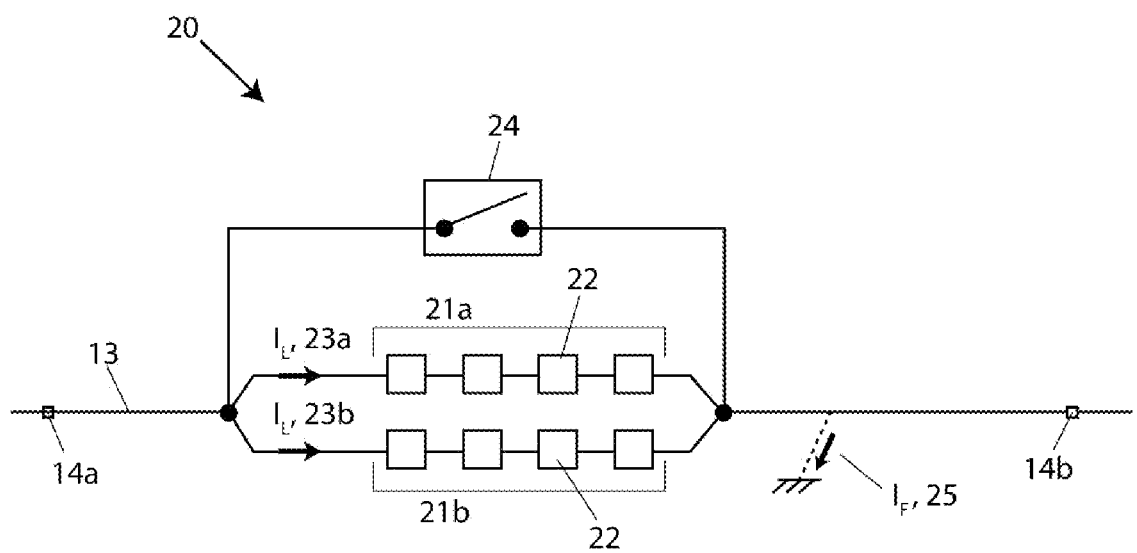
FIG. 2 is a schematic showing a power flow control system comprising a matrix of impedance injection modules (TL-SSSCs), installed onto a phase of a power distribution system, wherein a fault from phase to ground is present.

FIG. 2 shows details of a power flow control system 20 installed in a single phase 13 of a power transmission line. A leg 21a of series impedance injection modules 22 is shown, carrying a load current $I_L$, 23a. A parallel leg 21b similarly comprising series impedance injection modules 22 is also shown, carrying a similar load current $I_L$, 23b. Thus, power flow control system 20 comprises an m×n matrix of impedance injection modules, where m is the number of series impedance injection modules in a leg, and n is the number of parallel legs. In FIG. 2, m=4 and n=2. Preferably impedance injection modules 22 are standardized with respect to their hardware; this enables convenient mixing and matching to form alternate installations having different requirements, with any required customization being performed in software. A bypass switch 24 is shown. Bypass switch 24 may be closed following detection of a fault, depending on the characterization of the fault, to be further described. A fault current $I_F$ 25 is shown, from phase 13 to ground. Many other types of faults may occur, such as from phase to phase or phase to ground, including combinations of both phase to phase and phase to ground faults. Although in a preferred embodiment of the present disclosure a fault from phase to ground is described, a person of ordinary skill in the art will understand that similar strategies may be employed for other types of faults.

Figure 3:
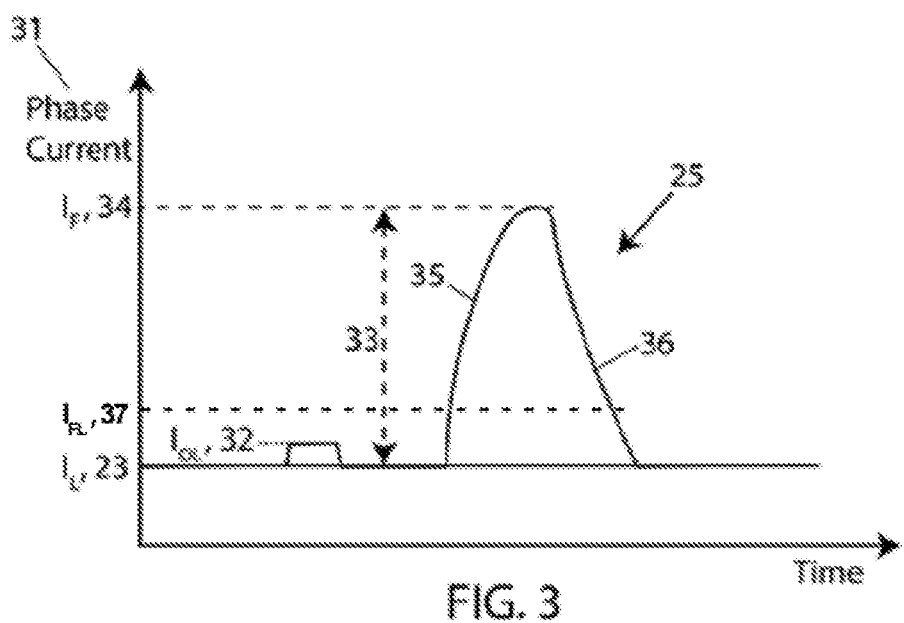
FIG. 3 is a graph of phase current versus time, showing a nominal load current, an overload current, and a fault current.

FIG. 3 shows a graph of phase current 31 versus time, including a normal load current $I_L$ 23, an overload current $I_{OL}$ 32 and a fault current peak value $I_F$ 34. It may be preferred that phase 13 remain in service despite an overload current 32 if the increase in current is not larger than a predetermined threshold above the normal load current 23. A typical predetermined threshold would comprise a 10% increase. Region 33 depicts a current range within which an intelligent characterization or assessment of fault current is most valuable in order to make good decisions about how to respond to the fault, including decisions about closing or not closing bypass switch 24 and decisions made at a central support facility about closing or not closing various circuit breakers (not shown). Fault current 25 may be characterized by its peak value 34, by its rise time 35, by its fall time 36, and by other factors such as the measured temperature of a temperature sensor. One type of temperature sensor that may be used is a resistance temperature detector, RTD, as is known in the art.

A fault current having an abrupt rise time such as 35 shown in FIG. 3 may be characterized as a hard fault. A hard fault may be caused by a fallen branch of a tree that shorts between two phases for example. A fault current having a less abrupt rise time may be characterized as a soft fault and may require more time to characterize. A soft fault may be caused by incipient failure of an insulator disposed between two phases for example.

Figure 4:
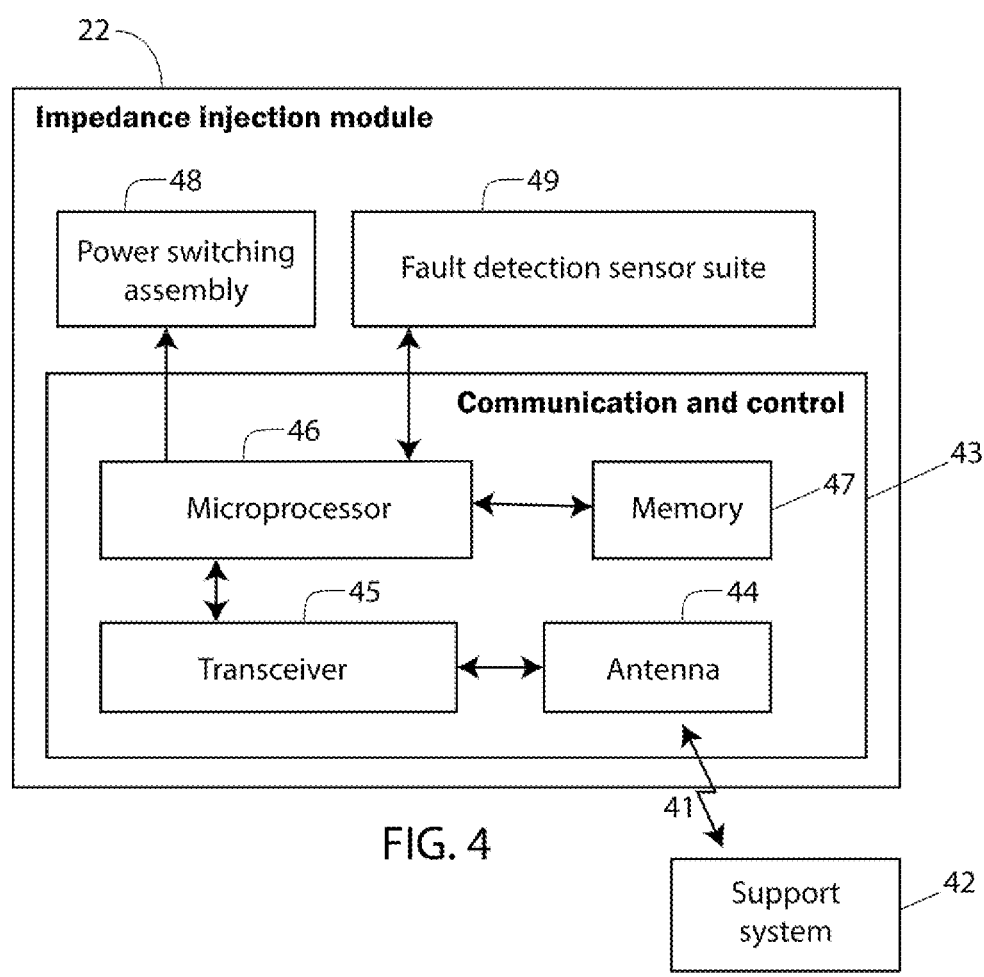
FIG. 4 is a block diagram of an impedance injection module of the present disclosure, including a fault detection sensor suite.

FIG. 4 is a block diagram of impedance injection module 22, in an embodiment of the present disclosure. Impedance injection module 22 communicates wirelessly 41 with an external support system 42. Support system 42 may have supervisory control over the power distribution system 10 of FIG. 1. Impedance injection module 22 comprises a communication and control subsystem 43 including an antenna 44, a transceiver 45, a microprocessor 46 and a memory 47. Memory 47 contains instructions executable by microprocessor 46 for configuring, controlling, and reporting out of impedance injection module 22. During operation, microprocessor 46 commands a power switching assembly 48 that connects impedance injection module 22 into phase line 13, as shown in FIG. 2, to implement a power flow control system such as 20 of FIG. 2. Microprocessor 46 also communicates with a fault detection sensor suite 49, to be further described. Power switching assembly 48 in one embodiment may comprise four high current switching devices for connecting and operating impedance injection module 22 in series with phase line 13, as depicted in FIG. 2, to implement a power flow control system such as 20 of FIG. 2.

Figure 5:
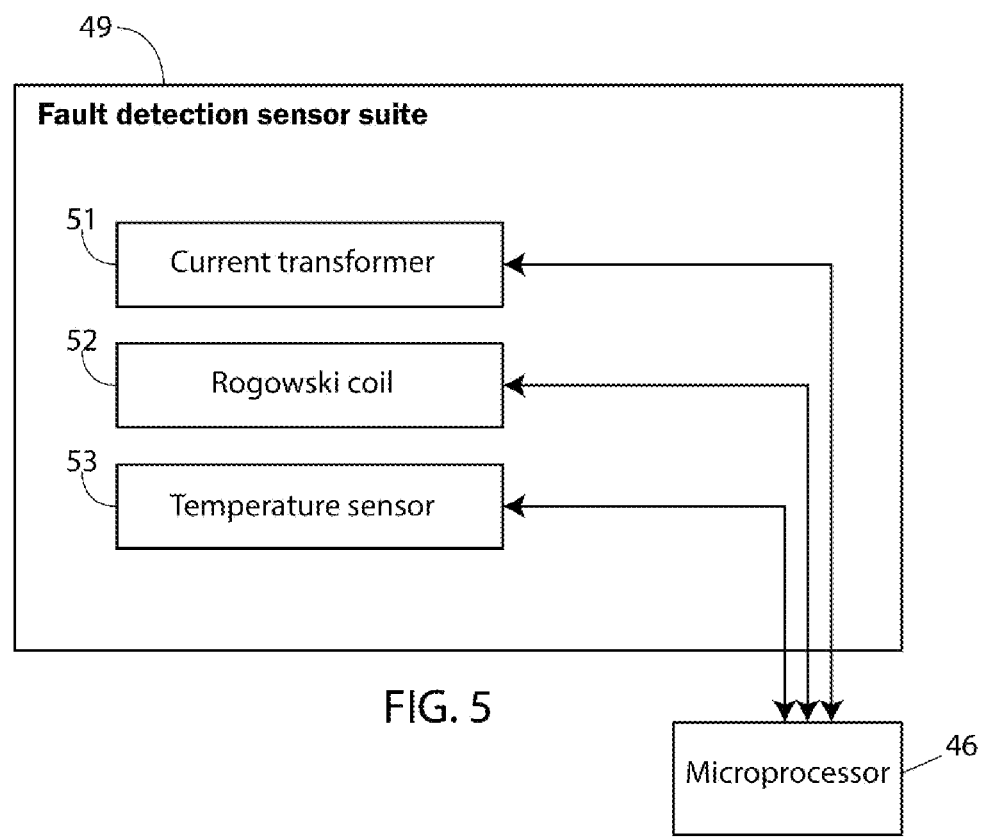
FIG. 5 is a block diagram of a fault detection sensor suite of the present disclosure, including a microprocessor interface.

FIG. 5 shows an interface between microprocessor 46 and fault detection sensor suite 49. Fault detection sensor suite 49 is shown comprising a current transformer 51, a coil 52 (e.g., Rogowski coil), and a temperature sensor 53.

Figure 6:
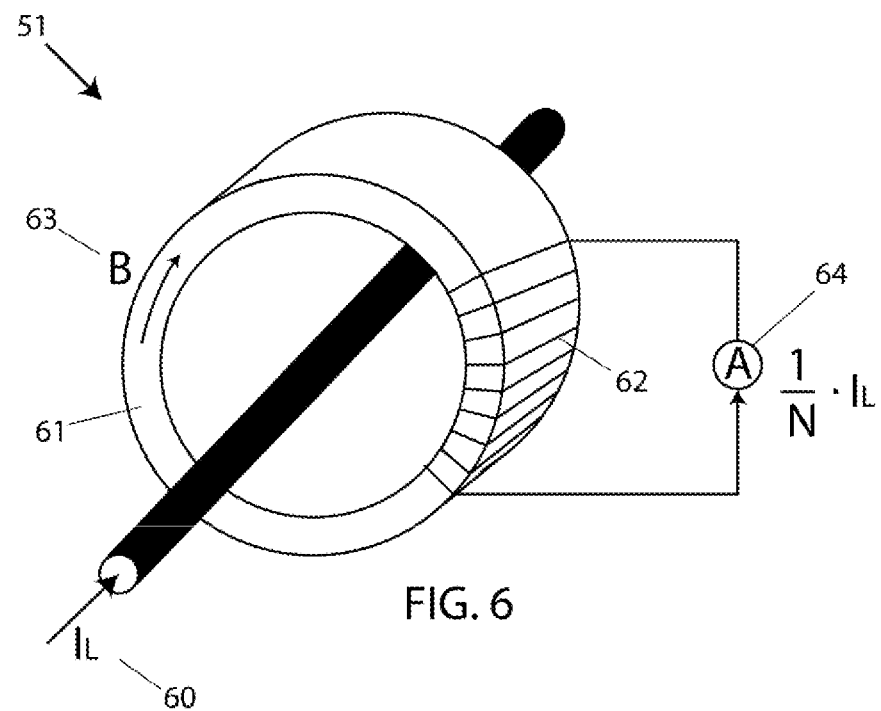
FIG. 6 is a schematic drawing of a current transformer.

FIG. 6 is a schematic of current transformer 51, showing a central transmission line carrying a load current $I_L$ 60. $I_L$ 60 is an AC current. The central transmission line can be regarded as a primary transformer winding having a single turn. Magnetic core 61 is wound with a secondary winding 62 comprising N turns. Varying magnetic flux B 63 is induced in magnetic core 61 as shown. An AC ammeter 64 is shown carrying a current $1/N \times I_L$. Thus, the current measured by AC ammeter 64 can be multiplied by N to determine $I_L$ 60. This current measuring device requires calibration to account for magnetic saturation of core 61 when $I_L$ 60 has a large value such as during a fault condition.

Figure 7:
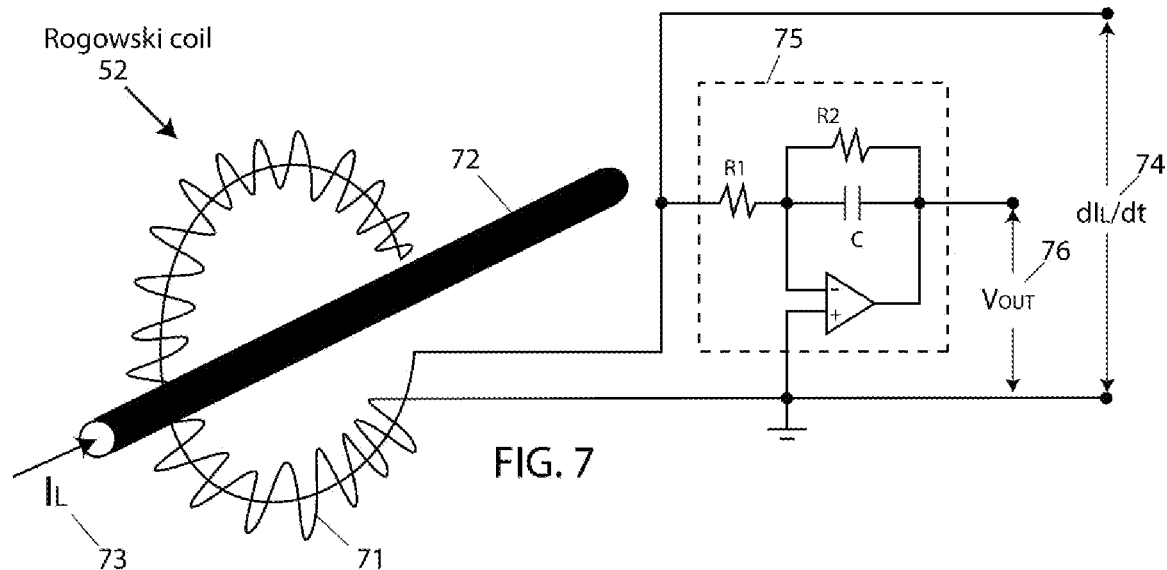
FIG. 7 is a schematic drawing of a Rogowski coil.

FIG. 7 is a schematic of the Rogowski coil 52, as used in an embodiment of the present disclosure. Rogowski coil 52 is shown with a helical winding 71 surrounding a central current conductor 72 (e.g., a phase line) carrying a load current $I_L$ 73. The return of helical winding 71 is passed back through its center as shown. The output of helical winding 71 is the time derivative of load current $I_L$, $dI_L/dt$, 74. The output of helical winding 71 may also be connected to an integrator circuit 75, producing $V_{OUT}$ 76 which is proportional to $I_L$ 73. Since for a given current rating of a central conductor such as 72, coil 52 has a lower inductance than current transformer 51 of FIG. 6, it has a faster response to a current transient such as rise time 35 of FIG. 3. When the output 74 of coil 52 is used directly as a measure of $dI_L/dt$, and this direct output is appropriately combined with a current sensor output (to be subsequently described) and the combination used directly to compare with a fault current limit $I_{FL}$, 37 to control bypass switch 24 of FIG. 2, power flow control system 20 will have a fast response to the initiation of a fault current such as fault current 25 of FIG. 2. Such high speed response is in essence not in the digital domain, but is an analog response not depending on any circuit initiation, clocking or any other imposed delay, and may operate at minimum response time on any circuit breaker re-closing as occurs to see if the fault remains, as is typically needed when in fact the fault does remain. Note that because the Rogowski coil as shown may provide outputs of the rate of change of transmission line current as well as transmission line current itself, a Rogowski coil may be used as both the transmission line current sensor (current transformer) and the rate of change of transmission line current sensor.

Note that the fault current waveform shown in FIG. 3 is not cut off at the trailing end, as would occur if a circuit breaker opens the line. Typically a fault current is tolerated for a few seconds before a circuit breaker opens the line, so the present invention must protect the impedance injection modules at least during the period between start of the fault current and the opening of the line by a circuit breaker, or the decay of the fault current to acceptable levels, whichever occurs first. Preferably the system will be programmed so that the bypass switch 24, once closed, will remain closed during the maximum period the fault current will be allowed to persist before a circuit breaker is opened, and since the protection system operates on energy harvested from the line or leg, the protection system must be fully operative from a fully powered down condition when the circuit breaker re-closes.

The use of two current measuring devices, coil 52 of FIG. 7 and current transformer 51 of FIG. 6, may lead to a faster and more accurate characterization of a fault current such as $I_F$ 25 of FIG. 2. Coil 52 can typically respond to a fault current within 100 nanoseconds for example, enabling a first decision to be made about closing a bypass switch such as 24 of FIG. 2, and also enabling a second decision to be made about reporting the fault to an external support system such as 42 of FIG. 4, these decisions to be made and executed within 10-50 microseconds following the leading edge of a fault current transient such as a hard fault depicted by rise time 35 of FIG. 3. This is a faster response than can typically be achieved with distance relays for example. Also, the redundancy provided by employing two independent current measuring devices leads to a higher reliability of fault detection sensor suite 49, as used for fault detection and characterization.

Either or both of a current transformer and a Rogowski coil may be used to measure and characterize current (I) and rate of change of current dI/dt, also designated $dI_L/dt$, in a transmission line (phase) or leg. A lightly loaded current transformer will directly sense dI/dt, or dI/dt may be determined from the output of the current transformer used to sense I, though a Rogowski coil is preferred because of its speed and direct sensing of dI/dt.

In an embodiment of the present disclosure, a mathematical equation is used, having current and rate of change of current as variables. The equation may be of the form $I_{FL}$, 37=A(I)+B(dI/dt), where $I_{FL}$, 37 is the value of a predetermined phase or leg current at which the bypass switch is to be closed in any event, I is the current in that phase or leg and dI/dt is the rate of change of that current, A is a constant and B is a constant having the units of time. $I_{FL}$, 37 (or a voltage V proportional thereto) is compared against a predetermined value or threshold as a key factor in the characterization. The use of the dI/dt component results in a look-ahead characteristic, in that the closing of the bypass switch 24 is not based simply on the present value of the apparent load current $I_L$, 23, but also based on where that current appears to be headed because of its present rate of change. In that regard, one might use a progressive or hierarchal fault current determination scheme, such as first detecting an extraordinary rate of change of the phase or leg current as the first, fastest and easiest to detect parameter to exceed a predetermined limit on an extraordinary occurrence, and if that is not determinative, then considering a combination of phase or leg current and rate of change of phase or leg current, and if that too is not determinative, then also considering the outputs of any other fault sensors and their variables. The predetermined phase or leg current and/or rate of change thereof at which the bypass switch is to be closed in any event may be fixed, may be programmable or dynamically updated wirelessly by messages sent from support system 42 (FIG. 4), and/or varied by inclusion of other variables.

Other variables that may be provided by other sensors in a fault detection sensor suite may be invoked to improve the characterization of a fault current. One example is temperature, wherein instructions executed by a processor such as microprocessor 46 of FIG. 4 are used to interpret temperature sensor readings to arrive at a measured temperature (T). An expanded mathematical equation such as $I_{FL}$, 37=A(I)+B(dI/dt)+C(T) may be used to characterize the fault for example, where C is a constant having units of amps/deg, the temperature component reducing the fault current limit $I_{FL}$, 37 for already hot impedance injection modules. A, B and C (as well as $I_{FL}$, 37) may be wirelessly programmable or fixed, as desired. Additional forms of expanded equations may be used to improve the fault characterization by invoking other variables, as detected by other sensors in the fault detection sensor suite 49, each sensor reading interpreted by instructions contained in a memory such as 47, executed by a processor such as microprocessor 46.

It will be clear to practitioners of the art that embodiments of the present invention may include many alternative strategies for responding to a fault current; these include using a mathematical equation such as defined herein for $I_{FL}$ and $I_{FL2}$, and also include protection strategies that are triggered by a single sensor measurement. For example, detection of a very high rate of change of current, dI/dt, may accompany a violent event such as a lightning strike. Accordingly, it may be prudent to take immediate action, irrespective of any information provided by other sensors in the fault detection sensor suite 49.

A high fault current such as $I_F$ 25 of FIG. 2 can generate massive amounts of heat in components of an impedance injection module 22 of the present disclosure, sufficient to melt heavy current carrying components in some cases. To mitigate against such an occurrence of extreme thermal stress, an additional safety factor may be achieved by providing temperature sensor 53 in fault detection suite 49, to monitor the temperature of one or more critical components in each impedance injection module 22.

Machine learning may be applied to a large number of fault current measurements taken using the fault detection sensor suite of the present disclosure, or a similar suite of sensors, to further refine the characterization and reporting of fault currents. The system intelligence obtained via machine learning may be further utilized in embodiments of the present disclosure to predict transmission line faults before they occur, with concomitant savings in maintenance costs, and in the costs of system down time. For example, following a report of a predicted fault, preventive maintenance strategies may be evaluated by an external support system such as support system 42 of FIG. 4, and appropriate maintenance strategies invoked to avoid the predicted fault.

Thus, the present disclosure has a number of aspects, which aspects may be practiced alone or in various combinations or sub-combinations, as desired. While certain preferred embodiments of the present disclosure have been disclosed and described herein for purposes of illustration and not for purposes of limitation, it will be understood by those skilled in the art that various changes in form and detail may be made therein without departing from the spirit and scope of the disclosure.

What is claimed is:

1. A power flow control system for a power transmission line comprising:
   at least one impedance injection module coupled to the power transmission line, each impedance injection module including a current transformer, a Rogowski coil, a microprocessor and a memory;
   a bypass switch coupled around the at least one impedance injection module;
   wherein the memory contains instructions executable by the processor to process outputs from the current transformer and from the Rogowski coil to determine current and rate of change of current in the power transmission line; and,
   to use a mathematical equation comprising the variables of current and rate of change of current in the power transmission line to compare a calculated value against a pre-determined threshold value to characterize a fault that may have occurred, and to close the bypass switch if a fault has occurred.

2. The power flow control system of claim 1 wherein values of current and rate of change of current in the mathematical equation comprise weighted values of current and rate of change of current.

3. The power flow control system of claim 1 wherein the mathematical equation for the calculated value is of the form A(I)+B(dI/dt), where I is the power transmission line current, dI/dt is the rate of change of power transmission line current, and A and B are constants.

4. The power flow control system of claim 1, further comprising a temperature sensor whose output is used to further characterize the fault.

5. The power flow control system of claim 1, wherein the decision whether to close the bypass switch is made within 50 microseconds of the fault occurrence.

6. The power flow control system of claim 1, wherein when a fault has occurred, the fault is reported to a support system within 50 microseconds.

7. The power flow control system of claim 1 configured so as not to interfere with the normal operation of distance relays deployed in the transmission line.

8. The power flow control system of claim 7 wherein not interfering with normal operation includes not requiring any reprogramming of the distance relays to compensate for the power flow control system installation.

9. The method of claim 8 wherein the closing of the bypass switch is achieved within 50 microseconds of the fault occurrence.

10. A method for early detection and reporting of transmission line faults comprising:
   providing at least one impedance injection module;
   providing a bypass switch;
   providing at least one current sensor;
   providing a microprocessor;
   providing a memory containing instructions executable by the processor to process output from the at least one current sensor to determine current and rate of change of current in the transmission line during a fault;
   applying a mathematical equation comprising the variables current and rate of change of current in the transmission line to characterize a fault that may have occurred by comparing a calculated value against a pre-determined threshold value;

deciding whether to close the bypass switch based on the comparison;

deciding whether to report the fault based on the comparison;

closing the bypass switch when decided to do so; and, reporting the fault to a support system when desired.

11. The method of claim 10 further comprising:

providing a communication and control subsystem including a transceiver and an antenna; and, dynamically updating the predetermined thresholds via messages sent wirelessly by a support system.

12. The method of claim 11 wherein the mathematical equation further includes temperature as a variable, the temperature determined by processing in the microprocessor inputs from a temperature sensor.

13. The method of claim 11 wherein the reporting of the fault is achievable within 50 microseconds of the fault occurrence.

14. The method of claim 10 further comprising:

providing a communication and control subsystem including a transceiver and an antenna in each impedance injection module for reporting the fault to a support system.

15. The method of claim 10 wherein the current and rate of change of current are derived from measurements using a Rogowski coil or in combination with a current transformer as the current sensor.

16. A method for detecting and reporting a fault in a phase of a power transmission line comprising:

providing a fault detection sensor suite having a plurality of fault detection instruments including at least a current transformer detecting current in the power transmission line, a Rogowski coil detecting a rate of change of current in the power transmission line, and a temperature sensor;

combining parameters detected by the plurality of fault detection instruments according to a mathematical equation;

comparing the result of combining parameters detected by the plurality of fault detection instruments to a predetermined threshold value;

when the result of combining parameters detected by the plurality of fault detection instruments exceeds the predetermined threshold value, providing a bypass switch closure signal that will cause a bypass switch to close, and causing the reporting of the detection of a fault in the phase of a power transmission line.

17. A power flow control system for attaching to a power transmission line comprising:

at least one impedance injection module for connecting to the power transmission line;

a bypass switch for connecting to the power transmission line to bypass the at least one impedance module when the bypass switch is closed;

a current transformer for sensing current in the power transmission line;

a Rogowski coil for sensing the rate of change of current in the power transmission line;

a microprocessor;

a memory;

wherein the memory contains instructions executable by the processor to combine outputs from the current transformer and from the Rogowski coil in a predetermined manner and to compare the combination with a pre-determined threshold value to characterize a fault that may have occurred, and to close the bypass switch if the comparison is indicative of a fault current.

18. The system of claim 17 wherein the memory contains instructions executable by the processor to combine the outputs from the current transformer and from the Rogowski coil using weighted averages of the outputs from the current transformer and from the Rogowski coil.

19. The system of claim 17 wherein the memory contains instructions executable by the processor to combine the outputs from the current transformer and from the Rogowski coil using a mathematical equation using the variables current in the power transmission line and rate of change of current in the power transmission line.

20. The system of claim 17 wherein the instructions combine outputs from the current transformer and from the Rogowski coil in accordance with a mathematical equation in the form $A(I)+B(dI/dt)$, where I is the current in the power transmission line, $dI/dt$ is the rate of change of current in the power transmission line, and A and B are constants.

21. The system of claim 20 further comprising a temperature sensor, and wherein the instructions further combine an output of the temperature sensor with the outputs from the current transformer and from the Rogowski coil in accordance with a mathematical equation in the form $A(I)+B(dI/dt)+C(T)$, where T is an output of the temperature sensor and C is a constant.

* * * * *